United States Patent [19]

Suzuki et al.

[11] 4,434,469
[45] Feb. 28, 1984

[54] AUTOMATIC SPEED CONTROL SYSTEM FOR AN AUTOMOTIVE VEHICLE

[75] Inventors: Kouichi Suzuki; Kazuyuki Mori, both of Yokohama, Japan

[73] Assignee: Nissan Motor Company, Limited, Kanagawa, Japan

[21] Appl. No.: 225,370

[22] Filed: Jan. 15, 1981

[30] Foreign Application Priority Data

Jan. 18, 1980 [JP] Japan .................................. 55-3655

[51] Int. Cl.³ .......................................... B60K 31/00
[52] U.S. Cl. ................... 364/426; 364/424; 364/565; 180/176; 180/179; 123/352
[58] Field of Search ........................ 364/424, 426, 565; 340/62; 123/352; 180/170, 174, 176-179

[56] References Cited

U.S. PATENT DOCUMENTS

| | | | |
|---|---|---|---|
| 3,455,411 | 7/1969 | Carp et al. ........................... | 180/105 |
| 4,098,367 | 7/1978 | Fleischer ............................. | 364/424 |
| 4,117,903 | 10/1978 | Fleischer et al. .................... | 180/179 |
| 4,120,373 | 10/1978 | Fleischer ............................. | 180/179 |
| 4,140,202 | 2/1979 | Noddings et al. .................. | 364/426 |
| 4,254,844 | 3/1981 | Collonia .............................. | 180/179 |

*Primary Examiner*—Gary Chin
*Attorney, Agent, or Firm*—Lowe, King, Price & Becker

[57] ABSTRACT

An automatic speed control system for an automotive vehicle for controlling the vehicle driving speed at a pre-set constant speed comprising a setting device for pre-setting as desired vehicle speed, a control for controlling the throttle valve position or the carburetor in order to keep the vehicle speed at the pre-set value, and an accelerator switch for resetting the pre-set value and renewing the pre-set value in the control system. A safety means is provided in the control system and is cooperative with a brake switch which is turned on while the brake is applied. The safety means becomes operative in response to turning on of the brake switch while the accelerator switch is in an ON condition.

16 Claims, 3 Drawing Figures

AUTOMATIC SPEED CONTROL SYSTEM FOR AN AUTOMOTIVE VEHICLE

BACKGROUND OF THE INVENTION

The present invention relates generally to an automatic speed control system for an automotive vehicle, a so-called "cruise control" system for maintaining the vehicle speed at a desired and pre-set constant value. More specifically, the invention relates to an automatic speed control system having therein an accelerator switch for resetting and renewing the pre-set value in the system and a means for preventing the vehicle from unnecessarily and uncontrollably accelerating by maintaining the accelerator switch in position.

Various kinds of automatic speed control systems for automatically controlling the vehicle speed at a pre-set constant value have been developed. Such devices are known as "cruise control systems" and are useful for driving the vehicle for relatively long periods of time at a constant speed. Generally, the automatic vehicle speed control system is provided with a means for setting a vehicle speed at a desired value to control the vehicle speed thereto. While the control system is in operative and therefore controls the vehicle speed at a pre-set constant value, the control system becomes inoperative if a vehicle brake is applied or if a clutch is disengaged by operating the clutch pedal or by setting the transmission lever to the neutral position. On the other hand, if the vehicle's accelerator is depressed, thus causing an accelerator switch to be turned on while the control system is operating to control the vehicle speed, the pre-set value in the system is cleared and the vehicle speed is accelerated at a given rate for so long as the accelerator switch is maintained in its ON position. Upon releasing the accelerator, thereby turning off the accelerator switch, the vehicle speed at that time is set as a renewed pre-set value.

In such automatic speed control systems, a disadvantage has been expected that, if the accelerator switch is damaged while it is turned on, and therefore it can not return to its OFF position, the vehicle is accelerated uncontrollably responsive thereto by the control system. This will necessarily cause danger for the vehicle since the vehicle speed is unexpectedly and uncontrollably accelerated to the maximum speed thereof. By application of the brake and turning off the power supply to the control system, acceleration of the vehicle (caused by maintaining the accelerator switch ON) can be temporarily stopped and the vehicle can be decelerated to a safe speed. However, once the brake is released, the control system returns to its operative mode to continue to accelerate the vehicle due to the ON position of the accelerator switch.

Therefore, the present invention provides a fail-safe system for an automatic vehicle speed control system for preventing the vehicle from unnecessarily and uncontrollably accelerating even when the system is damaged and is kept in an accelerating mode.

SUMMARY OF THE INVENTION

It is an object of the present invention to provide an automatic speed control system for an automotive vehicle capable of making the control system inoperative responsive to an output fed from the brake switch while the accelerator switch is in an ON position and thereby capable of ensuring the vehicle safety while driving under automatic speed control operation.

According to the present invention, there is provided an automatic speed control system for an automotive vehicle comprising a setting means for pre-setting a desired vehicle speed, a control means for controlling the throttle valve position or carburetor in order to keep the vehicle speed at the pre-set value, and an accelerator switch for resetting the pre-set value and renewing the pre-set value in the control system. A safety means is provided in the control system which cooperates with a brake switch turned on while the brake is applied. The safety means becomes operative in response to turning on of the brake switch while the accelerator switch is in an ON position.

In a preferred embodiment of the present invention, the safety means is connected both to the accelerator switch and to the brake switch and functions as an AND gate for outputting a reset command for making the control system inoperative when the outputs from both of the accelerator switch and the brake switch are input thereto. The safety means is interpositioned between the power supply means and the control means for cutting off the power supply to the control means responsive to a reset command inputted thereto.

The other objects of the invention will become clear from the hereinafter given detailed description of the invention in terms of the preferred embodiment of the present invention.

BRIEF DESCRIPTION OF THE DRAWINGS

The present invention will become more fully understood from the detailed description given hereafter and from the accompanying drawings of the preferred embodiment of the present invention, which, however, should not be taken as limitative of the present invention but only for purposes of elucidation and explanation.

In the drawings.

DESCRIPTION OF THE PREFERRED EMBODIMENT

Figure 1:
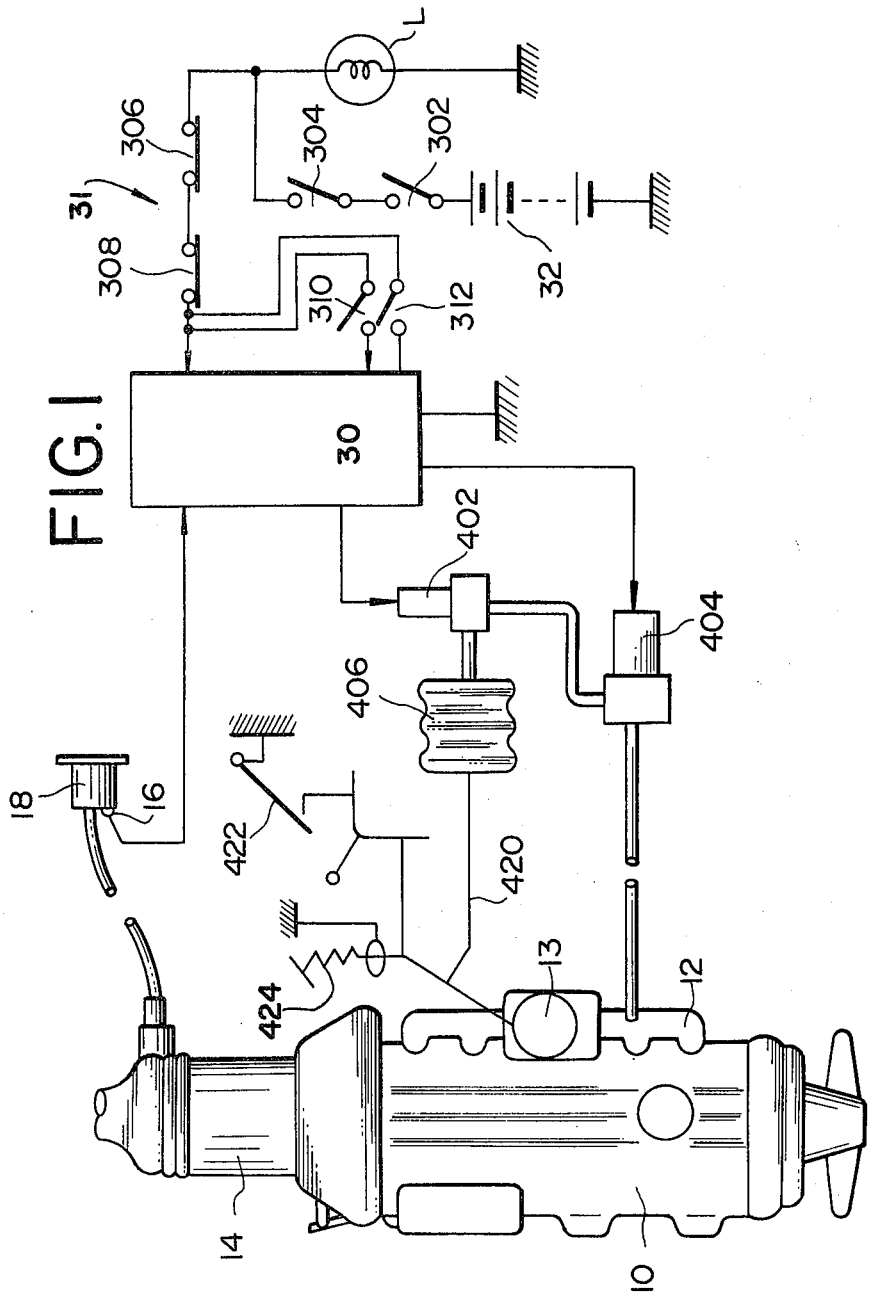
FIG. 1 is a schematic illustration of a preferred embodiment of an automatic speed control system for an automotive vehicle according to the present invention, which shows a general construction of the whole system of the control system.
Figure 2:
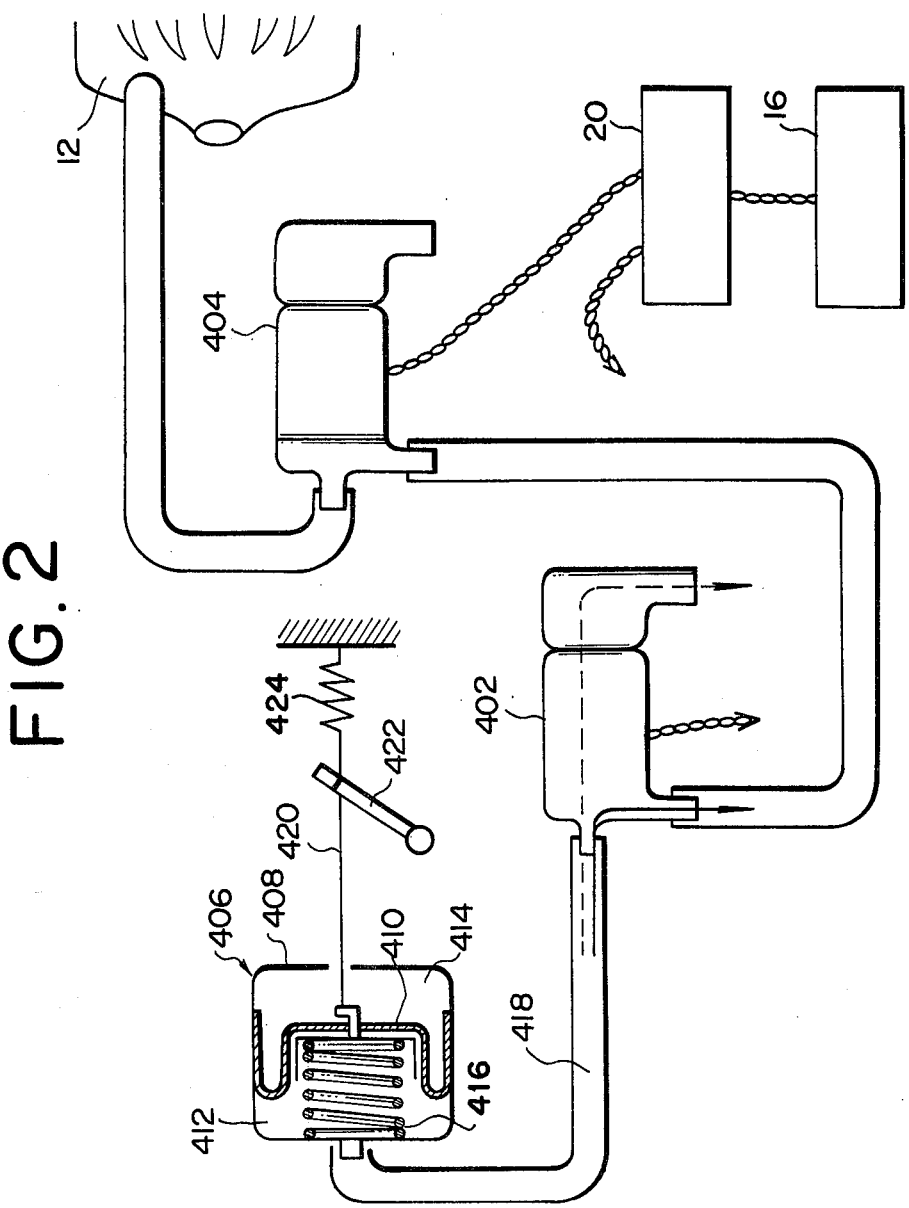
FIG. 2 is a schematic illustration of a part of the control system of FIG. 1 showing some details of the construction of the control system according to the present invention.

Referring now to the drawings, particularly to FIGS. 1 and 2, there is illustrated a general construction of a preferred embodiment of an automatic speed control system according to the present invention. In FIG. 1, a reference numeral 10 denotes an internal combustion engine having therewith an intake manifold 12 for introducing an intake air or air/fuel mixture into the combustion chamber of the engine. The engine 10 is coupled with a transmission 14. A vehicle speed sensor 16, such as electromagnetic pick up mounted on a vehicle wheel shaft, is provided to sequentially determine the vehicle speed. The vehicle speed sensor 16 generates a sensor signal, for example an analog signal, indicative of the determined vehicle speed. The sensor signal is fed to a speed meter 18 and is also fed to a controller 30 of the automatic speed control system.

The controller 30 is connected with an electric power supply circuit 31 and with a vehicle battery 32 through the power supply circuit 31. In the power supply circuit 31 are interpositioned an ignition switch 302, a main switch 304, a brake switch 306, a clutch switch 308 sequentially connected with each other and with the vehicle battery 32. A set switch 310 and an accelerator switch 312 are respectively interposed between the power supply circuit 31 (at clutch switch 308) and the controller 30 in parallel relationship with respect to one another. Generally, the controller is responsive to the turning on of the set switch 310 for pre-setting a desired vehicle speed and generating a control signal based on the difference between the pre-set vehicle speed and the actual vehicle speed. The control signal is fed to a valve actuator 402 and a servo valve 404. The control signal acts as a servo current for the servo valve 404 for controlling the opening ratio of the valve 404 in order to control induction of vacuum from the intake manifold 12. Therefore, the vacuum pressure produced within the servo valve is proportional to the signal value of the control signal. The vacuum produced in the servo valve 404 is fed to the valve actuator 402 for operating an actuator 406 responsive thereto. As shown in FIG. 2, the actuator 406 comprises an actuator housing 408 and a diaphragm member 410 partitioning the interior of the housing 408 into two chambers 412 and 414. In the chamber 412 is disposed a spring 416 for providing the diaphragm member 410 an initial pressure to be initially applied in order to determine a set force thereof. The chamber 412 communicates with the valve actuator 402 through an induction passage 418. The diaphragm member 410 is mechanically connected with an accelerator linkage 420 which connects an accelerator pedal 422 and a throttle valve (not clearly shown) disposed within the carburetor 13.

In operation of the automatic vehicle speed control system according to the present invention, the vehicle speed is sequentially determined by the vehicle speed sensor 16. The vehicle speed sensor 16 generates the sensor signal indicative of the determined vehicle speed and feeds the sensor signal to the controller 30. If the vehicle speed reaches a valve at which the driver wishes to drive the vehicle at a constant speed, set switch 310 is operated. Responsive to turning on of the set switch 310, the controller 30 holds the sensor signal value as a pre-set value. The controller 30 compares the actual vehicle speed represented by the sensor signal sequentially input to the controller 30 with the pre-set value. Based on the difference between the actual and preset values, the controller 30 generates a control signal acting as servo current for the servo valve 404. The servo valve 404 varies the opening period of the valve for controlling induction amount of the vacuum from the intake manifold 12 in order to produce a control signal proportional to the control signal value. In response to the control vacuum produced in the servo valve 404, the valve actuator 402 becomes operative to introduce the control vacuum to the actuator 406. Depending on the introduced control vacuum, the diaphragm member 410 of the actuator is deformed to move the accelerator linkage 420.

Assuming the actual vehicle speed is lower than the pre-set value, the control vacuum introduced within the actuator 406 to operate the accelerator linkage 420 to increase the opening ratio of the throttle valve in the carburetor against a return spring 424 normally biasing the accelerator pedal 422 in a direction that the throttle valve is fully closed.

It should be noted that the servo current provided from the controller 30 for defining the value of control vacuum is approximately in a range of 140 mA to 180 mA. The amount of servo current is reduced if the actual vehicle speed exceeds the pre-set value therefor.

Figure 3:
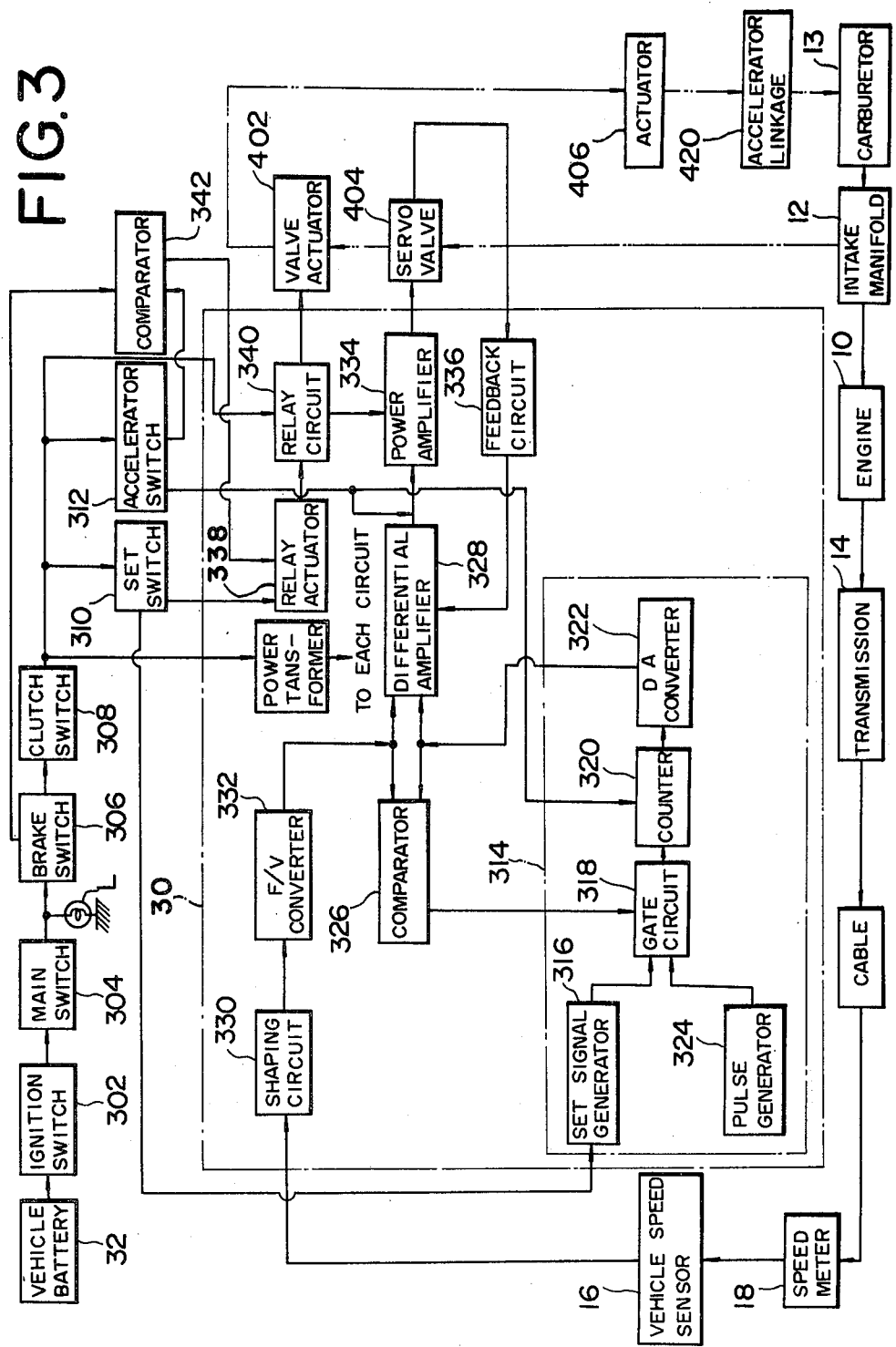
FIG. 3 is a block diagram of a preferred embodiment of an electric circuit of the automatic speed control system of the present invention.

Referring now to FIG. 3, there is illustrated a preferred embodiment of an electric circuit of the automatic vehicle speed control system according to the present invention, in which the circuit is shown in the form of a block diagram. Though the details of each element of the are not illustrated, the figure is understandable for those skilled in the art, since each element is known per se from the prior art. In FIG. 3, the controller 30 and the actuation means for operating the throttle valve in the carburetor 13 are illustrated in the form of blocks each representing a mechanical element.

The vehicle battery 32 is connected with the set switch 310 through the ignition switch 302, main switch 304, brake switch 306 and the clutch switch 308. Likewise, the accelerator switch 312 is connected to the vehicle battery 32 through the foregoing switches. The set switch 310 is further connected with a memory unit 314. The memory unit 314 comprises a set signal generator 316, a gate circuit 318, a counter 320, a digital-analog converter 322 and a pulse generator 324. The set signal generator 316 is responsive to turning on of the set switch 310 and outputs a set signal to the gate circuit 318. The pulse generator 324 generates a train of pulses at a constant frequency and provides the pulse train to the gate circuit 318. The gate circuit 318 is responsive to the set signal and to an output fed from a hereinafter described comparator 326 to open the gate for transmitting the pulse signal output from the pulse generator 324 to the counter 320. The counter 320 counts up the number of pulses fed from the gate circuit 318 and returns the counter value to zero when the counted value reaches a predetermined value, for example, 128. The digital-analog converter 322 generates an analog signal value which is proportional to the counter value fed from the counter 320. The analog signal generated by the digital-analog converter 322 is fed to the comparator 326 and to a differential amplifier 328.

To the comparator 326 and the differential amplifier 328, a sensor signal indicative of the actual vehicle speed determined by the vehicle speed sensor 16 is input through a shaping circuit 330 and a frequency-voltage converter 322. The sensor signal fed from the vehicle seed sensor 16 is re-shaped into a rectangular pulse through the shaping circuit 330. The rectanguler pulse output from the shaping circuit 330 is converted into an analog signal having a voltage corresponding to the frequency of the rectangular pulse. The comparator 326 compares the analog signal fed from the frequency-voltage converter 332 and indicative of the actual vehicle speed with the analog signal fed from the digital-analog converter 322. The comparator generates a binary code signal based on the result of comparation. If the signal value of the analog signal indicative of the actual vehicle speed is equal to or larger than the analog signal value indicative of the pre-set speed, the signal value of the binary code signal is zero and otherwise is 1. As stated above, the binary code signal is fed to the gate circuit 318 to make it open when the signal value is 1.

In the differential amplifier 328, both of the analog signals respectively fed from the frequency voltage amplifier 332 and the digital-analog converter 322 are compared to obtain the difference therebetween. Based on the determined difference of the analog signal values, the differential amplifier 328 generates a control signal to be fed to the servo valve 404. A power amplifier 334 is interposed between the differential amplifier 328 and the servo valve 404 to amplify the signal value of the control signal. The servo valve 404 generates a feedback signal to be fed back to the differential amplifier through a feedback circuit 336.

On the other hand, the set switch 310 is connected with the power amplifier 334 through a relay actuator 338 and relay circuit 340. The relay actuator 338 and the relay circuit 340 serve to maintain the circuit for supplying the power to the controller 30. Namely, once the relay actuator 338 becomes operative responsive to turning on of the set switch 310, the relay circuit 340 is kept in an ON position even if the set switch 310 returns to an OFF position. In the shown embodiment of the present invention, the accelerator switch 312 is interpositioned between the vehicle battery 32 and the counter 320. Also, the accelerator switch 312 is connected with a comparator 342. The comparator 342 is connected with the relay actuator 338. Responsive to turning on of the accelerator switch 312, the present value in counter 320 is reset. Therefore, the digital-analog converter outputs no output and thereby the differential amplifier 328 becomes inoperative. At the same time, the power of the vehicle battery 32 is supplied to the power amplifier 334 through the accelerator switch 312 as a constant value of input. Therefore, a constant value of power amplifier output is input to the servo valve 404 to accelerate the vehicle at a given rate corresponding to the power supplied to the power amplifier 334. In the preferred construction, the accelerator switch 312 is a normally open type of switch automatically returning to its normal position in response to a releasing force applied thereto. Therefore, when the accelerator switch 312 is released and therefore returns to the opened position, the counter 320 starts counting again. At the moment of releasing the accelerator switch 312, the memory unit 314 stores the vehicle speed at that time period as a renewed pre-set vehicle speed.

For presetting desired vehicle speed to the presetting memory unit 314, the set switch 310 is operated. Responsive to turning on of the set switch 310, the set signal generator 316 generates the set signal and feeds the same to the gate circuit 318. Since, at this moment the digital-analog converter 322 outputs the analog signal having a value less than that of the analog signal fed from the frequency-voltage converter 332, the comprator 326 outputs a binary code signal having a value 1. Therefore, responsive to turning on of the set switch 310, the gate circuit 318 opens to pass the pulse signal generated and output from the pulse generator 324. Thus, the counter 320 counts up the pulse signal until the counted value therein, which is output through the digital-analog converter 322, becomes equal to the analog signal value indicative of the actual vehicle speed. Responsive to varying of the binary signal value output by comparator 326 to zero when the analog signal value indicative of the pre-set vehicle speed becomes equal to the analog signal value indicative of the actual vehicle speed, the gate circuit 318 turns to its closed position to interrupt the pulse signal passing therethrough.

Once the desired vehicle speed is pre-set in the memory unit 314, the control system operates to control the vehicle speed to the pre-set value in a manner as explained with reference to FIGS. 1 and 2.

If necessity to renew the pre-set value and to pre-set the vehicle speed to a higher value than that previously pre-set, the accelerator switch 312 is operated to clear the content of the counter 320. During the time that accelerator switch 312 is turned on, the constant value of electric power is supplied to the power amplifier 334 to actuate the servo valve 404 at a constant rate. The servo valve therefore operates the valve actuator 402 to produce the control vacuum. By application of the control vacuum, the accelerator linkage 420 is operated through the actuator 406 to increase the opening ratio of the throttle valve. Thus, the vehicle is accelerated at a given rate. Responsively to turning off of the accelerator switch 312, the memory unit 314 holds a counter value indicative of the pre-set vehicle speed which is the vehicle speed at the point of releasing the accelerator switch 312.

A comparator 342 is connected to receive the outputs of the accelerator switch 312 and the brake switch 306. If the brake switch signal is input while the output from the accelerator switch 312 is also input, the comparator 342 becomes operative to reset the relay actuator 338 and thus to cause the relay circuit 340 to be cut off. Therefore, responsive to resetting of the relay actuator 338, the controller 30 becomes inoperative to return the vehicle to a manual control mode for vehicle speed control. The comparator 342 may act as a safety means for the automatic vehicle speed control system according to the present invention for preventing the vehicle from unnecessarily or unexpectedly accelerating. For example, such safety means is useful in case that the accelerator switch 312 is damaged and assumes or retains an ON condition, thereby tending to supply a constant value of electric power to the servo valve. Namely, assuming the accelerator switch 312 is damaged while it is operated and thereby the vehicle is going to be accelerated, acceleration of the vehicle can be stopped by application of the brake.

What is claimed is:

1. An automatic speed control system for an automotive vehicle comprising:

a vehicle speed sensor for determining a vehicle speed and generating a sensor signal having a value indicative of the determined vehicle speed;

first means including presetting means for presetting a desired vehicle cruise speed to drive the vehicle at the preset cruise speed, said presetting means being manually operative for presetting said cruise speed as it is operated;

second means having an operative and an inoperative condition, said second means manually operable, independently of said first means, for resetting the preset cruise speed in said first means and for changing the preset value in said presetting means, said second means accelerating the vehicle at a predetermined rate while it is in its operative condition, said second means activating said first means in response to said second means attaining said inoperative condition thereby to change the preset value in said first means to a current vehicle speed determined when said second means attains said inoperative condition;

a power circuit for supplying electric power to said first and second means while the system is operating;

third means, responsive to a decelerating operation of the vehicle for generating an interruption signal for interrupting the operation of said control system; and fourth means, connected between said power circuit and said first means and associated with said second and third means, for cutting off the electric connection between said power circuit and said first means in order to make said control system inoperative in response to said interruption signal when said second means is in its operative condition.

2. A control system as set forth in claim 1, which includes a controller for controlling a throttle valve angular position based on a difference of the sensor signal value and said preset value so that said difference is reduced to zero, and wherein said first means comprises a manually operable first switching means for pre-setting the desired vehicle cruise speed, and a memory means responsive to turning on of said first switching means.

3. A control system as set forth in claim 2, wherein said first means further includes a holding means responsive to said first switching means for maintaining said first means in a connected condition with said power circuit, and said holding means is coupled with said fourth means in order to disconnect said first means from said power circuit responsive to operation of said fourth means.

4. A control system as set forth in claim 1, which includes a controller for controlling a throttle valve angular position based on a difference of the sensor signal value and said preset cruise speed so that said difference is reduced to zero, and wherein said second means is coupled with said fourth means and is connected between said power circuit and said controller, said second means including a second switch means which is turned on to supply a constant value of electric power to said controller in order to accelerate the vehicle at the predetermined rate.

5. A control system as set forth in claim 4, wherein said third means comprises a brake switch responsive to application of vehicle brake and turning on while the brake is applied, and said fourth means further comprises a comparator receiving outputs of said second means and said brake switch and functioning as an AND gate for generating said interruption signal when both of said outputs are input thereto in an ON condition thereby to establish an AND condition.

6. An automatic speed control system for an automotive vehicle for controlling vehicle speed at a pre-set value, which includes a vehicle speed sensor for determining vehicle speed, a setting means for presetting a desired vehicle speed in a memory means, a control signal generator for generating a control signal based on the difference between an actual vehicle speed and the pre-set speed and a mechanical control means for converting an electric parameter of the control signal into a magnitude of mechanical motion and operating an accelerator controller in order to reduce the difference between the actual vehicle speed and the pre-set speed to zero, said control system further including a fail-safe system for preventing the system for effecting malfunctional control operation, wherein the improvement comprising:

a renewing means associated with said memory means and manually operable independently of said setting means, for renewing the pre-set value, said renewing means having an operative and an inoperative condition, said renewing means operable for resetting the pre-set value in said memory means and for making said control signal generator inoperative while said renewing means is in its operative condition and further operable for changing the pre-set value to the speed of the vehicle when said renewing means attains its inoperative condition; and fail-safe means being coupled with said renewing means to receive an output therefrom indicating operation thereof, said fail-safe means arranged for making said control system inoperative when said renewing means is in its operative condition and a vehicle brake is applied.

7. A control system as set forth in claim 6, wherein said renewing means is connected between an electric power supply circuit and said mechanical control means for supplying a constant value of electric power to said mechanical control means while said renewing means is in its operative condition in order to accelerate the vehicle at a given constant rate, said renewing means being further operable for changing the pre-set speed value in said memory means to a vehicle speed determined when the renewing means attains its inoperative condition.

8. A control system as set forth in claim 7, wherein said fail-safe means is connected between said electric power supply circuit and said control signal generator and wherein said fail-safe means is responsive, when said renewing means is in its operative condition, to an output of a brake switch which turns on responsive to application of the vehicle's brake by cutting off power supplied to said control signal generator and thus make the latter inoperative.

9. A control system as set forth in claim 8, wherein said fail-safe means comprises a comparator means acting as an AND gate.

10. In an automatic speed control system for automatically controlling driving speed of an automotive vehicle at a constant pre-set value, including a vehicle speed sensor generating a sensor signal having a value indicative of determined vehicle speed, a memory means for pre-setting a desired vehicle speed therein and generating a constant value of signal indicative of the pre-set vehicle speed, a setting means manually operable for pre-setting the desired vehicle speed in said memory means, a renewing means having an ON and an OFF condition for changing the pre-set value, a control signal generator for generating a control signal based on a difference between the value of said sensor signal and the pre-set value and a mechanical control means for controlling a throttle valve provided in an induction system of an internal combustion engine, which control means includes a converter means for converting the electrical signal value of the control signal into magnitude of mechanical motion of the control means;

a method for preventing the system from malfunctioning to accelerate the vehicle uncontrollably comprising the steps of:

providing manual operation of said renewing means independently of said setting means and connecting said renewing means to said memory means for renewing the pre-set value at a value corresponding to the vehicle speed when said renewing means attains an OFF condition;

detecting presence of an output of said renewing means, which output is generated as long as said renewing means is maintained at an ON condition;

detecting application of a vehicle brake; and connecting said control signal generator to an electric power supply circuit and connecting therebetween a gate means blocking the passage of electric power therethrough while both the ON condition of the renewing means and the application of the vehicle brake are simultaneously detected.

11. A method as set forth in claim 10, comprising the further step of operating said gate means, when said renewing means is in an operative condition, responsively to turning on of a brake switch representing application of the brake, by providing an output of the brake switch to the gate means.

12. A method a set forth in claim 10 or 11, comprising the further step of resetting the pre-set speed value stored in said memory in response to turning the renewing means to its ON condition and, when the renewing means turns to its OFF condition, changing the pre-set value to the speed detected when the renewing means turns to said OFF condition.

13. An automatic speed control system for an automotive vehicle comprising:

a vehicle speed sensor for determining a vehicle speed and generating a sensor signal having a value indicative of the determined vehicle speed;

first means for presetting a desired vehicle cruise speed to drive the vehicle at the preset cruise speed;

said first means comprising a manually operable first switching means for presetting the desired vehicle cruise speed and a memory means responsive to turning on of said first switching means;

second means associated with said memory means of said first means and having operative and inoperative conditions, said second means manually operable for resetting the preset cruise speed in said first means and for changing the preset value in said memory means of said first means, said second means being further operable for producing an acceleration signal for accelerating the vehicle at a predetermined rate while it is in its operative condition, said second means activating said first means in response to said second means attaining said inoperative condition thereby to change the preset value in said memory means of said first means to a current vehicle speed determined at the time of attaining of said inoperative condition, whereby the desired vehicle cruise speed stored in said memory means is reset to zero upon operation of said second means, and is set to the current vehicle speed upon deactivation of said second means to its inoperative condition;

third means for detecting an application of a vehicle brake for producing a disabling signal for disabling said control system; and fourth means incorporating an electric power circuit for supplying electric power to said first and second means and detecting said acceleration signal and disabling signal for cutting off the power supply to said first and second means when both of said acceleration signal and said disabling signal are detected simultaneously;

whereby said automatic speed control system is prevented from malfunctioning to accelerate the vehicle uncontrollably.

14. A control system as set forth in claim 13, wherein said memory means comprises a set signal generator responsive to turning on of said first switching means for generating a set signal, a pulse generator for generating a pulse train, a gate circuit means receiving said set signal and said pulse train for passing said pulse train therethrough only when a determined actual vehicle speed is lower than the preset cruise speed and said set signal is being generated, a counter means for counting up the number of pulses passing through said gate circuit means and a digital-analog converter means receiving a binary counter signal indicative of the number counted by said counter means for converting the binary counter signal into an analog signal having a value corresponding to that of said binary counter signal and representing the preset cruise speed, said counter continuing its counting operation until the actual vehicle speed is accelerated to said preset cruise speed.

15. A control system as set forth in claim 14, further comprising comparator means receiving said analog signal representing the number counted by said counter means and an analog signal representative of the determined actual vehicle speed for generating an output signal indicative of a condition wherein the actual vehicle speed is lower than the preset cruise speed, said output signal provided to said gate circuit means.

16. An automatic speed control system for an automotive vehicle comprising:

power supply means for providing power to the control system;

control means for receiving power from said power supply means and for controlling a vehicle speed at a preset cruise speed;

renewing means having an ON and an OFF condition and operable for renewing the preset cruise speed value in said control means and for changing the preset value to a current vehicle speed determined when said renewing means attains its OFF condition;

brake switch means connected in series with said control means and said power supply means to disable operation of the control system upon application of a vehicle brake;

said control means having a first input receiving electric power through said brake switch means;

set switch means, including a manually operable set switch member and receiving electric power through said brake switch means and providing a set signal to a third input of said control means;

accelerator switch means, including an accelerator switch member which is manually operable independently of said set switch member and receiving electric power through said brake switch means and connected to a second input of said control means and having ON and OFF conditions, said accelerator switch means providing an acceleration signal to said control means for providing a constant rate of acceleration for said automotive vehicle;

said control means including a holding circuit means responsive to activation of said set switch means to provide electric power to said control system; and AND circuit means responsive to an AND condition of said brake switch means and said accelerator switch means to reset said holding means, thereby disabling said control system until a subsequent actuation of said set switch means, whereby uncontrolled operation of said control system due to a failure of said accelerator switch means is prevented by a single activation of said brake switch means.

* * * * *